(12) United States Patent
Sakatoku et al.

(10) Patent No.: US 6,613,818 B1
(45) Date of Patent: Sep. 2, 2003

(54) COATING COMPOSITION FOR PREPARING ANTICORROSIVE MIRROR

(75) Inventors: Motoyuki Sakatoku, Mie (JP); Kenichi Hayashi, Mie (JP); Yoshihisa Tamura, Mie (JP); Yutaka Mori, Osaka (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 08/828,012

(22) Filed: Mar. 27, 1997

(30) Foreign Application Priority Data

Mar. 29, 1996 (JP) .............................. 8-075060

(51) Int. Cl.⁷ ............................. C08K 5/46; C08K 5/34; C08K 5/17
(52) U.S. Cl. ............................. 524/83; 524/89; 524/94; 524/101; 524/254
(58) Field of Search ............................. 428/53, 58, 434; 524/83, 89, 94, 101, 254

(56) References Cited

U.S. PATENT DOCUMENTS 5,389,419 A * 2/1995 Maeda et al. .............. 428/64.8
5,561,033 A * 10/1996 Kashi et al. ................. 430/601

* cited by examiner

Primary Examiner—Kriellion S. Morgan
(74) Attorney, Agent, or Firm—Crowell & Moring LLP

(57) ABSTRACT

The invention relates to a coating composition for preparing a back coating film of a mirror. This mirror serving as an anticorrosive mirror has a glass substrate, a silver mirror film that comprises silver and is formed on a back surface of the glass substrate, a metallic protective film that comprises a first metal and is formed on the silver mirror film, and the back coating film formed on the metallic protective film. The coating composition is substantially free of a lead component and comprises (a) a vehicle containing a synthetic resin, (b) a first salt formed by a neutralization of an acid with a base containing a second metal having an ionization tendency that is greater than the silver and the first metal, and (c) a basic compound selected from the group consisting of azoles and diamines. The acid is one compound selected from the group consisting of organic acids each containing an azole ring and unsubstituted and substituted carbamic acids. The mirror has advantageous characteristics, in mechanical processability and chemical and mechanical durabilities, which are comparable to those of a mirror having a back coating film containing a lead pigment.

11 Claims, No Drawings

COATING COMPOSITION FOR PREPARING ANTICORROSIVE MIRROR

BACKGROUND OF THE INVENTION

The present invention relates to a coating composition for preparing a back coating film of a mirror. The back coating film prepared by curing the coating composition provides the mirror with anticorrosion property.

Conventional back coating films for mirror contain corrosion-inhibitive lead pigments, such as red lead, white red, basic lead sulfate, lead cyanamide, and calcium plumbate. The incorporation of such lead pigment has so-called advantageous cation effect, reducing effect, neutralization effect, and anion effect. By this cation effect, ionization and deterioration of metal(s) (i.e., silver, copper and/or at least one other metal) of mirror are suppressed by lead having an ionization tendency greater than those of these metals. By the reducing effect, a reducing atmosphere is produced at the interface between the back coating film and the silver mirror film or the metallic (e.g., copper) protective film, thereby to suppress oxidation of the silver mirror film and the metallic protective film. By the a neutralization effect, a rust of the silver film and/or of the metallic protective film is neutralized by a basic substance generated from a lead pigment, thereby to suppress oxidation of the silver mirror film and/or the metallic protective film. By the anion effect, an anion (e.g., that of cyanamide) reacts with a metal ion derived from the silver mirror film and/or from the metallic protective film. With this, there is formed a passive film that suppresses corrosion of the silver mirror film and the metallic protective film. By the above-mentioned cation, reducing, neutralization, anion effects, the occurrence of corrosion and deterioration of the peripheral and inner portions of the mirror can be prevented.

Japanese Patent Unexamined Publication JP-A-7-261007 discloses a coating composition for preparing a back coating film of a mirror. This coating composition contains a binder of a bisphenol-type epoxy ester resin, benzotriazole and/or its derivative, red lead, and the like (see Tables 1–2). The use of lead in mirror, however, is not desirable from an environmental point of view, as will be mentioned hereinafter. Nevertheless, if the lead pigment is omitted in this coating composition, its anticorrosion property becomes inferior to those containing a lead pigment.

JP-A-7-234306 discloses a mirror that has a special film 4 interposed between a copper protective film 3 and a back coating film 5, in order to improve the mirror in chemical durability. This special film 4 is prepared by applying benzotriazole and/or its derivative to the copper protective film 3. In this publication, it is stated that the back coating film 5 may be formed by using one of various conventional alkyd resin paints, epoxy resin paints, and epoxy ester resin paints. It is known that these paints contain a lead pigment (s). As stated above, the use of lead in mirror is not desirable. In spite of that, if the lead pigment is omitted in the back coating film, the mirror may become unsatisfactory in anticorrosion property.

The use of lead in mirror may cause an environmental hazard. According to an analysis conducted by an examination organization (TCLP) certified by U.S. Environmental Protection Agency (EPA), it was found that conventional mirrors having a back coating film containing a lead pigment contain 30–60 mg/L of lead. Under the EPA's regulation, this concentration is far greater than the permissible upper limit of the lead concentration (i.e., 5.0 mg/L) of wastes to be dumped. Thus, in the United States, it is prohibited to dump cullet and wastes of such mirrors. In view of this, there is a strong demand for a mirror that is substantially free of lead and has advantageous characteristics, in mechanical processability and chemical and mechanical durabilities, which are comparable to those of a mirror having a back coating film containing a lead pigment.

SUMMARY OF THE INVENTION

It is therefore an object of the present invention to provide a coating composition for preparing a back coating film of a mirror that is superior in anticorrosion property and is substantially free of lead to reduce a risk of the environmental impact.

It is another object of the present invention to provide such anticorrosive mirror having the back coating film prepared by curing the coating composition.

It is a more specific object of the present invention to provide an anticorrosive mirror that is substantially free of lead and has advantageous characteristics, in mechanical processability (e.g., in cutting and chamfering) and chemical and mechanical durabilities, which are comparable to those of a mirror having a back coating film containing a lead pigment.

According to the present invention, there is provided a coating composition for preparing a back coating film of a mirror. This mirror serving as an anticorrosive mirror has a glass substrate, a silver mirror film that comprises silver and is formed on a back surface of the glass substrate, a metallic protective film that comprises a first metal and is formed on the silver mirror film, and the back coating film formed on the metallic protective film. The coating composition is substantially free of a lead component and comprises (a) a vehicle containing a synthetic resin, (b) a first salt formed by a neutralization of an acid with a base containing a second metal having an ionization tendency that is greater than the silver and the first metal, and (c) a basic compound selected from the group consisting of azoles and diamines. The acid is one compound selected from the group consisting of organic acids each containing an azole ring and unsubstituted and substituted carbamic acids.

According to the present invention, there is further provided such an anticorrosive mirror comprising (a) a glass substrate, (b) a silver mirror film that comprises silver and is formed on a back surface of the glass substrate, (c) a metallic protective film that comprises a first metal and is formed on the silver mirror film, and (d) a back coating film that is formed on the metallic protective film and is prepared by curing the above-mentioned coating composition.

DESCRIPTION OF THE PREFERRED EMBODIMENTS

An anticorrosive mirror according to the present invention can be formed at first by forming on a glass substrate a silver mirror film and then a metallic protective film, for example, by spraying, and then by forming on the metallic protective film a back coating film for providing the mirror with anticorrosion property. The silver mirror film contains silver and may further include at least one other metal such as chromium and titanium. The metallic protective film contains a first metal which is not particularly limited. Copper, which is the most commonly used for conventional metallic protective films, may be used as the first metal. The back coating film is formed at first by applying a coating composition according to the present invention to the metallic protective film and then by curing the coating composition.

This application may be conducted, for example, by roller coating, flow coating, and spraying.

As stated above, a coating composition according to the present invention for preparing the back coating film is substantially free of a lead component and comprises (a) a vehicle containing a synthetic resin, (b) a first salt formed by a neutralization of an acid with a base containing a second metal (e.g., zinc or iron) having an ionization tendency that is greater than the silver and the first metal (e.g., copper), and (c) a basic compound selected from the group consisting of azoles and diamines. The acid is one compound selected from the group consisting of organic acids each containing an azole ring and unsubstituted and substituted carbamic acids. Each of the first salt and the basic compound can serve as an anticorrosive agent for the mirror. When both of the first salt and the basic compound are used together, there may be obtained the above-mentioned advantageous cation, reducing, neutralization and anion effects, which are comparable to those of a lead pigment.

The first salt of the coating composition has the following advantageous effects. As stated above, the second metal has an ionization tendency that is greater than the silver and the first metal (e.g., copper). Therefore, ionization of the silver and the first metal is effectively suppressed by the second metal. Even if the silver and/or the first metal is ionized to produce a cation, an anion obtained by dissociation of the first salt may react with this cation, thereby to form a passive film. This passive film may increase adhesion of the back coating film to the metallic protective film and/or to the silver mirror film, and suppress the infiltration of corrosive substances. The first salt can be at least one metal salt selected from the group consisting of metal thiazoles, metal benzimidazoles and metal dithiocarbamates. Nonlimitative examples of the first salt are zinc 2-mercaptobenzothiazole, zinc dimethyldithiocarbamate, zinc diethyldithiocarbamate, zinc dibutyldithiocarbamate, zinc N-ethyl-N-phenyldithiocarbamate, zinc N-pentamethylenedithiocarbamate, zinc dibenzyldithiocarbamate, ferric dimethyldithiocarbamate, zinc 2-mercaptobenzimidazole, and zinc 2-mercaptomethylbenzimidazole. The first salt, for example, zinc 2-mercaptobenzothiazole, may be dissociated, as shown in the following reaction formula (1), and may react with the first metal (e.g., copper) and/or silver, thereby to form copper 2-mercaptobenzothiazole and/or silver 2-mercaptobenzothiazole, as shown in the following reaction formulas (2) and (3). With this, the infiltration of corrosive substances may be suppressed, as stated above.

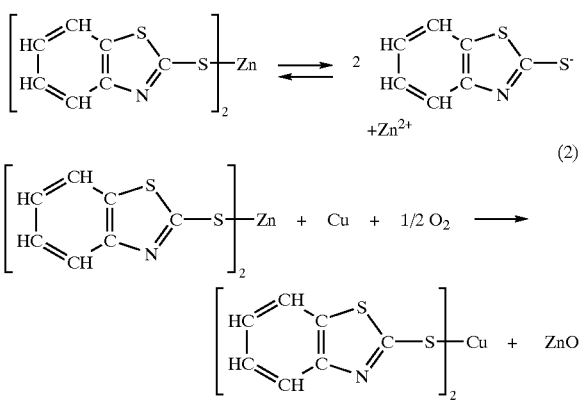

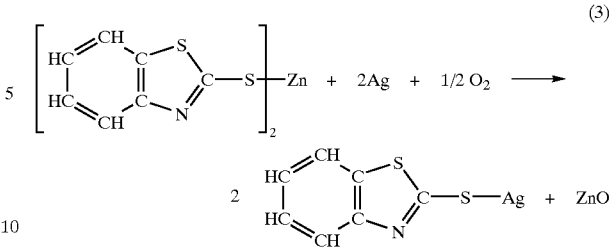

In the invention, the first salt can be in an amount of from 1 to 15 wt %, furthermore from 3 to 11 wt %, of the solid matter contained in the coating composition. If it is less than 1 wt %, adhesion of the back coating film to the metallic protective film may become inferior. Furthermore, the mirror may become unsatisfactory in the after-mentioned salt spray test, copper accelerated acetic acid salt spray (CASS) test, and other tests. If it is greater than 15 wt %, viscosity of the coating composition may become too high during its storage, and its pigment tends to precipitate therein.

Conventional back coating films for mirror do not serve as a high barrier to suppress the permeation of gas molecules therethrough. Similarly, the silver mirror film and the metallic protective film for mirror in accordance with conventional technologies and the present invention allow the permeation of gas molecules therethrough, because these films are each prepared by the accumulation of the respective metal colloid particles. Thus, according to conventional mirrors, corrosive substances (e.g., oxygen and hydrogen) in the form of gas may permeate through the back coating film, then the metallic protective film, and then the silver mirror film, and thus may reach the surface of the glass substrate. In contrast, according to the present invention, the basic compound, which is selected from the group consisting of azoles and diamines and derived from the back coating film, tends to react with silver ions, copper ions, and/or other metal ions. With this, a rust of the silver mirror film and/or the metallic protective film may be neutralized, and thus the growth of rust of these films may be suppressed. The basic compound of the present invention can be at least one compound selected from the group consisting of imidazole derivatives, thiazole derivatives, and phenylenediamine derivatives. Nonlimitative examples of the basic compound are 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-methylimidazolium trimellitate, 1-cyanoethyl-2-ethyl-4-methylimidazolium trimellitate, 1-cyanoethyl-2-undecylimidazolium trimellitate, 1-cyanoethyl-2-phenylimidazolium trimellitate, 2,4-diamino-6-[2'-methylimidazolyl-(1')]ethyl-S-triazine, 2,4-diamino-6-[2'-ethyl-4'-methylimidazolyl-(1')]ethyl-S-triazine, 2,4-diamino-6-[2'-undecylimidazolyl-(1')]ethyl-S-triazine, adducts of 2,4-diamino-6-[2'-methylimidazolyl-(1')]ethyl-S-triazine and isocyanuric acid, adducts of 2-methylimidazole and isocyanuric acid, adducts of 2-phenylimidazole and isocyanuric acid, 2-phenyl-4,5-dihydroxymethylimidazole, 2-phenyl-4-methyl-5-hydroxymethylimidazole, 1-cyanoethyl-2-phenyl-4,5-dicyanoethoxymethylimidazole, 2-phenylimidazoline, 2-mercaptobenzimidazole, 2-mercaptomethylbenzimidazole, 2-mercaptobenzthiazole cyclohexylamine, 2-mercaptobenzthiazole dicyclohexylamine, m-phenylenediamine, p-phenylenediamine, p-(p-toluenesulfonylamide)diphenylamine, N,N'-di-2-naphthyl-p-phenylenediamine, N,N'-diphenyl-p-phenylenediamine, 3,5-diaminochlorobenzene, 3,5-phenylenediamine oxide, 2,4-diaminotoluene, 2,4-diaminophenol, 2,4-diaminodiphenylamine, 3,4-diaminobenzophenone, 2,4,6-trimethyl-1,3-phenylenediamine, 2,5-dimethyl-p-phenylenediamine, N,N'-dimethyl-p-phenylenediamine, N-methyl-N'-ethyl-p-phenylenediamine, N-methyl-N'-isopropyl-p-phenylenediamine, N,N'-diisopropyl-p-phenylenediamine, N-phenyl-N'-isopropyl-p-phenylenediamine, and N-phenyl-N'-(1,3-dimethylbutyl)-p-phenylenediamine. For example, 2,4-diamino-6-[2'-methylimidazolyl-(1')]ethyl-S-triazine, which is a basic compound of the present invention, may be decomposed by heat, as shown in the following reaction formula (4). The thus produced 2-methylimidazole may react with silver, copper, and/or at least one other metal, as shown in the following reaction formulas (5) and (6). With this, a rust of the silver mirror film and/or the metallic protective film may be neutralized, and thus the growth of rust of these films may be suppressed.

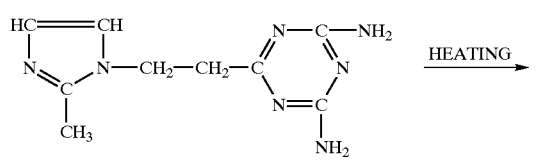

(4)

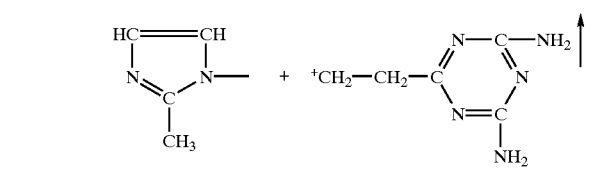

(5)

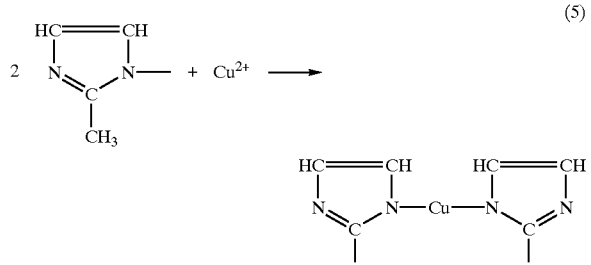

(6)

In the invention, the basic compound can be in an amount of from 0.5 to 5 wt %, furthermore from 1.5 to 3.5 wt %, of the solid matter contained in the coating composition. If it is less than 0.5 wt %, the mirror may become unsatisfactory in the after-mentioned salt spray test, CASS test, and other tests. If it is greater than 5 wt %, the back coating film may have blisters in the after-mentioned water resistance test.

In the invention, a synthetic-resin vehicle for preparing the back coating film is not particularly limited, and it can be selected from thermoplastic and thermosetting resins, depending on the condition for applying the back coating film and on the degree of durability that is required for mirror. Nonlimitative examples of the synthetic-resin vehicle are acrylic resins, polyester resins, alkyd resins, various modified alkyd resins, epoxy resins, urethane resins, fluororesins, vinyl resins, nitrocellulose-modified resins, phenol resins, amino-modified resins, and cellulose acetate butylate modified resins.

In the invention, the coating composition may contain at least one pigment. In the preparation of the coating composition, the weight ratio of the total of the at least one pigment, the first salt and the basic compound to the synthetic-resin in the form of solid can be in a range of from 1:1 to 3:1, furthermore from 1.4:1 to 2.2:1 If it is less than 1:1, the back coating film may become insufficient in hardness. Thus, it tends to have scratches thereon and may have blisters in the water resistance test. If it is greater than 3:1, adhesion of the back coating film to the metallic protective film may become inferior. Thus, the mirror may become inferior in chemical resistance, weather resistance, durability, and the like, and tends to have corrosion and/or deterioration at its peripheral portion and/or its inner portion.

In the invention, nonlimitative examples of the first metal other than copper are nickel, nickel alloys, tin, and tin alloys, and nonlimitative examples of the second metal are Zn, Fe, and Te.

The following nonlimitative examples are illustrative of the present invention.

EXAMPLE 1

At first, a coating composition for forming a back coating film was prepared by mixing components as shown in Table 1 in a high-speed agitator mill using glass beads, so that the coating composition contained solid matter having a particle size of up to 30 μm.

Separately, a glass substrate having a width of 150 mm, a length of 200 mm and a thickness of 5 mm was coated with a silver mirror film having a thickness of 90 nm, and then there was formed on the silver mirror film a metallic protective film that is made of copper and has a thickness of 30 nm, by a conventional chemical plating method. Then, the thus coated glass substrate was washed with water and then dried. After that, the coating composition was applied to the metallic protective film by an applicator, so that a back coating film under the wet condition had a thickness of 7 mil. Then, the back coating film was baked for 10 min. in a hot air drying oven having an atmospheric temperature of 160° C. Then, the coated glass substrate was allowed to stand still for two days at room temperature, thereby to prepare a mirror.

TABLE 1

| Composition | COATING COMPOSITION | | | | | | |
|---|---|---|---|---|---|---|---|
| (wt %) | Ex. 1 | Ex. 2 | Ex. 3 | Ex. 4 | Ex. 5 | Ex. 6 | Ex. 7 |
| Phenol-modified Alkyd Resin Solution[1] | 43.0 | 43.0 | 43.0 | 43.0 | 43.0 | 43.0 | 43.0 |
| Imidazole Derivatives | | | | | | | |
| 2MZ-A[2] | 0.9 | 1.5 | 2.1 | — | — | — | — |
| 2PZ-CN[3] | — | — | — | 0.9 | 1.5 | 2.1 | — |
| 2MA-OK[4] | — | — | — | — | — | — | 0.9 |

TABLE 1-continued

| Composition (wt %) | COATING COMPOSITION | | | | | | |
|---|---|---|---|---|---|---|---|
| | Ex. 1 | Ex. 2 | Ex. 3 | Ex. 4 | Ex. 5 | Ex. 6 | Ex. 7 |
| First Salts | | | | | | | |
| SANCELER-MZ[5] | 1.8 | — | — | — | — | — | 4.2 |
| SANCELER-PZ[6] | — | 4.2 | — | — | 6.6 | — | — |
| NOCRAC MBZ[7] | — | — | 6.6 | — | — | 1.8 | — |
| Body Pigments | | | | | | | |
| Talc | 10.0 | 10.0 | 10.0 | 10.0 | 10.0 | 10.0 | 10.0 |
| Precipitated Barium Sulfate | 11.8 | 8.8 | 5.8 | 7.0 | 11.2 | 8.2 | 9.4 |
| Calcium Carbonate | 10.0 | 10.0 | 10.0 | 10.0 | 10.0 | 10.0 | 10.0 |
| Color Pigment (Red Iron Oxide) | 4.0 | 4.0 | 4.0 | 4.0 | 4.0 | 4.0 | 4.0 |
| Dryers | | | | | | | |
| 6% Cobalt Naphthenate | 0.3 | 0.3 | 0.3 | 0.3 | 0.3 | 0.3 | 0.3 |
| 8% Zinc Naphthenate | 0.7 | 0.7 | 0.7 | 0.7 | 0.7 | 0.7 | 0.7 |
| Anti-skinning Agent (Methyl Ethyl Ketoxime) | 0.5 | 0.5 | 0.5 | 0.5 | 0.5 | 0.5 | 0.5 |
| Solvent (Xylene) | 17.0 | 17.0 | 17.0 | 17.0 | 17.0 | 17.0 | 17.0 |
| Solid Matter | 60 | 60 | 60 | 60 | 60 | 60 | 60 |
| Wt. Ratio of (Pigments + Anticorrosive Agents[8]) to Resin (solid) | 1.8 | 1.8 | 1.8 | 1.8 | 1.8 | 1.8 | 1.8 |

TABLE 2

| Composition (wt %) | COATING COMPOSITION | | | | | | |
|---|---|---|---|---|---|---|---|
| | Ex. 8 | Ex. 9 | Ex. 10 | Ex. 11 | Com. Ex. 1 | Com. Ex. 2 | Com. Ex. 3 |
| Synthetic Resin Solutions[1] | | | | | | | |
| Phenol-modified Alkyd Resin Sol. | 43.0 | 43.0 | — | — | 43.0 | 43.0 | 40.0 |
| Acrylic-modified Alkyd Resin Sol. | — | — | 38.0 | — | — | — | — |
| Thermosetting Acrylic Resin Sol. | — | — | — | 34.0 | — | — | — |
| Melamine Resin Sol. | — | — | 5.0 | 9.0 | — | — | — |
| Imidazole Derivatives | | | | | | | |
| 2MZ-A[2] | — | — | — | 1.5 | — | — | — |
| 2MA-OK[4] | 1.5 | 2.1 | 1.5 | — | 1.5 | — | — |
| First Salts | | | | | | | |
| SANCELER-MZ[5] | 6.6 | — | — | 4.2 | — | — | — |
| SANCELER-PZ[6] | — | 1.8 | — | — | — | — | — |
| NOCRAC MBZ[7] | — | — | 4.2 | — | — | 4.2 | — |
| Lead Sulfate | — | — | — | — | — | — | 10.0 |
| Body Pigments | | | | | | | |
| Talc | 10.0 | 10.0 | 10.0 | 10.0 | 10.0 | 10.0 | 10.0 |
| Precipitated Barium Sulfate | 6.4 | 10.6 | 8.8 | 8.8 | 13.0 | 10.3 | 6.0 |
| Calcium Carbonate | 10.0 | 10.0 | 10.0 | 10.0 | 10.0 | 10.0 | 10.0 |
| Color Pigment (Red Iron Oxide) | 4.0 | 4.0 | 4.0 | 4.0 | 4.0 | 4.0 | 4.0 |
| Dryers | | | | | | | |
| 6% Cobalt Naphthenate | 0.3 | 0.3 | — | — | 0.3 | 0.3 | 0.3 |
| 8% Zinc Naphthenate | 0.7 | 0.7 | — | — | 0.7 | 0.7 | 0.7 |
| Anti-skinning Agent (Methyl Ethyl Ketoxime) | 0.5 | 0.5 | — | — | 0.5 | 0.5 | 0.5 |
| Solvents | | | | | | | |
| n-Butanol | — | — | 5.0 | 5.0 | — | — | — |
| Xylene | 17.0 | 17.0 | 13.5 | 13.5 | 17.0 | 17.0 | 18.5 |
| Solid Matter | 60 | 60 | 60 | 60 | 60 | 60 | 60 |
| Wt. Ratio of (Pigments + Anticorrosive Agents[8]) to Resin (solid) | 1.8 | 1.8 | 1.8 | 1.8 | 1.8 | 1.8 | 1.8 |

(1): A 50 wt % resin solution containing a solvent of xylene or n-butanol, (2): A trade name of 2,4-diamino-6-[2'-methylimidazolyl-(1')]ethyl-S-triazine made by Shikoku Kasei Kogyo Co., (3): A trade name of 1-cyanoethyl-2-phenylimidazole made by Shikoku Kasei Kogyo Co., (4): A trade name of an adduct of 2,4-diamino-6-[2'-methylimidazolyl-(1')]ethyl-S-triazine and isocyanuric acid, (5): A trade name of zinc 2-mercaptobenzothiazole made by Sanshin Kagaku Kogyo Co., (6): A trade name of zinc dimethyldithiocarbamate mad by Sanshin Kagaku Kogyo Co., (7): A trade name of zinc 2-mercaptobenzoimidazole made by Oouchi Shinko Kagaku Kogyo Co., and (8): Anticorrosive Agents in Tables 1 and 2 are the total of the imidazole derivatives, the first salts, and lead sulfate Example 2–11 and Comparative Example 1–3

In each of these examples and comparative examples, a process of preparing a mirror according to Example 1 was repeated except in that the coating composition of Example 1 was modified as shown in Tables 1 and 2.

The coating compositions and the mirrors of Examples 1–11 and Comparative Examples 1–3 were subjected to the following evaluation tests.

Evaluation Tests

1. Back Coating Film Thickness Measurement Test

In this test, the thickness of the back coating film was measured by a thickness gauge. When the back coating film had a thickness of from 47 to 53 μm, its thickness was judged as being satisfactory.

2. Pencil Scratch Test

This test was made in accordance with Japanese Industrial Standard (JIS) K 5400 8.4. In this test, the highest hardness of a pencil that failed to give scratches on the back coating film was recorded. When this hardness is at least H, the back coating film was judged as being satisfactory in hardness.

3. Cross-cut Adhesion Test

In this test, a portion of the back coating film was cut with a knife so as to form 100 squares thereon each having widths of 1 mm. Then, a cellophane tape was attached to the portion having the 100 squares, and then the cellophane tape was removed to see if some squares are removed or not. The number of the squares remaining on the mirror after the removal of the cellophane tape was recorded as the result. When all of the 100 squares remained on the mirror after the removal of the cellophane tape, the back coating film was judged as being satisfactory in this test.

4. Acid Immersion Test

In this test, the mirror was immersed in a 5 wt % HCl aqueous solution at 25° C. for 8 hr. After that, the mirror was withdrawn to see if the back coating film has abnormality or not, to see if the mirror has abnormality or not in its inner portion when viewed from the glass substrate's side, and to determine the length of abnormalities in the peripheral portion of the mirror when viewed from the glass substrate's side. With respect to the back coating film in Tables 3–4, "A", which was judged as being satisfactory in this test, means that abnormality was not found thereon after the test, and "B" means that blisters were found thereon after the test. With respect to the inner portion of the mirror in Tables 3–4, "A", which was judged as being satisfactory in this test, means that abnormality was not found thereon after the test, and "∞" means that countless abnormalities were found thereon after the test. When the length of abnormalities in the peripheral portion of the mirror was up to 1.0 mm, it was judged as being satisfactory in this test.

5. Alkali Immersion Test

In this test, the mirror was immersed in a 5 wt % NaOH aqueous solution at 25° C. for 8 hr. After that, the mirror was withdrawn to see if the back coating film has abnormality or not, and to see if the mirror has abnormality or not in its inner and peripheral portions when viewed from the glass substrate's side. With respect to the back coating film in Tables 3–4, "A", which was judged as being satisfactory in this test, means that abnormality was not found thereon after the test, and "B" means that blisters were found thereon after the test. With respect to the inner and peripheral portions of the mirror in Tables 3–4, "A", which was judged as being satisfactory in this test, means that abnormality was not found thereon after the test.

6. Water Resistance Test

In this test, the mirror was immersed in tap water at 60° C. for 10 days. After that, the mirror was withdrawn to see if the back coating film has abnormality or not, to see if the mirror has abnormality or not in its inner portion when viewed from the glass substrate's side, and to determine the length of abnormalities in the peripheral portion of the mirror when viewed from the glass substrate's side. With respect to the back coating film in Tables 3–4, "A", which was judged as being satisfactory in this test, means that abnormality was not found thereon after the test, and "B" means that blisters were found thereon after the test. With respect to the inner portion of the mirror in Tables 3–4, "A", which was judged as being satisfactory in this test, means that abnormality was not found thereon after the test, and "∞" means that countless abnormalities were found thereon after the test. When the length of abnormalities in the peripheral portion of the mirror was up to 1.5 mm, it was judged as being satisfactory in this test.

7. Salt Spray Test

The mirror was subjected to a salt spray test according to JIS Z 2371 for 480 hr. After that, the mirror was checked to see if the back coating film has abnormality or not, to determine the number of abnormalities in its inner portion when viewed from the glass substrate's side, and to determine the length of abnormalities in the peripheral portion of the mirror when viewed from the glass substrate's side. With respect to the back coating film in Tables 3–4, "A", which was judged as being satisfactory in this test, means that abnormality was not found thereon after the test, and "B" means that blisters were found thereon after the test. With respect to the inner portion of the mirror in Tables 3–4, when the number of abnormalities was up to 5, it was judged as being satisfactory in this test. Furthermore, "∞" means that countless abnormalities were found in the inner portion of the mirror. When the length of abnormalities in the peripheral portion of the mirror was up to 3.0 mm, it was judged as being satisfactory in this test. With respect to the peripheral portion of the mirror in Tables 3–4, "X" means that it was impossible to determine the length of abnormalities.

8. Copper-accelerated Acetic Acid Salt Spray (CASS) Test

The mirror was subjected to this test for 120 hr in accordance with JIS D 0201. After that, the mirror was checked to see if the back coating film has abnormality or not, to determine the number of abnormalities in its inner portion when viewed from the glass substrate's side, and to determine the length of abnormalities in the peripheral portion of the mirror when viewed from the glass substrate's side. With respect to the back coating film in Tables 3–4, "A", which was judged as being satisfactory in this test, means that abnormality was not found thereon after the test, "B" means that a portion of the back coating film exfoliated from the mirror, and "C" means that the back coating film exfoliated from the mirror. With respect to the inner portion of the mirror in Tables 3–4, when the number of abnormalities was up to 5, it was judged as satisfactory in this test. When the length of abnormalities in the peripheral portion of the mirror was up to 3.0 mm, it was judged as being satisfactory in this test. With respect to the inner and peripheral portions of the mirror in Tables 3–4, "X" means that it was impossible to determine the length of abnormalities.

9. Storage Stability Test

In this test, the coating composition for preparing the back coating film was stored in an atmosphere of 50° C. for seven days. In Tables 3–4, "A" means that the coating composition after this test had no occurrence of grains, bubbles and other abnormalities. The coating composition was judged as being satisfactory in this test, when it was evaluated as "A", and when the viscosity of the coating composition after the test was up to two times the initial viscosity prior to the test. In this test, the viscosity of the coating composition was measured in accordance with JIS K 5400, using a Stomer viscometer. Its unit is expressed by "KU (Krebs unit)".

TABLE 3

|  | Ex. 1 | Ex. 2 | Ex. 3 | Ex. 4 | Ex. 5 | Ex. 6 | Ex. 7 |
| --- | --- | --- | --- | --- | --- | --- | --- |
| Back Coating Film Thickness ($\mu$m) | 49 | 51 | 50 | 48 | 49 | 50 | 50 |
| Pencil Scratch Test | H | H | H | H | H | H | H |
| Cross-cut Adhesion Test | 100 | 100 | 100 | 100 | 100 | 100 | 100 |
| Acid Immersion Test |  |  |  |  |  |  |  |
| Back Coating Film | A | A | A | A | A | A | A |
| Mirror Inner Portion | A | A | A | A | A | A | A |
| Mirror Peripheral Portion (mm) | 0.7 | 0.9 | 0.6 | 0.8 | 0.6 | 0.8 | 0.4 |
| Alkali Immersion Test |  |  |  |  |  |  |  |
| Back Coating Film | A | A | A | A | A | A | A |
| Mirror Inner Portion | A | A | A | A | A | A | A |
| Mirror Peripheral Portion | A | A | A | A | A | A | A |
| Water Resistance Test |  |  |  |  |  |  |  |
| Back Coating Film | A | A | A | A | A | A | A |
| Mirror Inner Portion | A | A | A | A | A | A | A |
| Mirror Peripheral Portion (mm) | 0.8 | 1.0 | 0.7 | 1.3 | 1.0 | 1.2 | 0.7 |
| Salt Spray Test |  |  |  |  |  |  |  |
| Back Coating Film | A | A | A | A | A | A | A |
| Mirror Inner Portion | 2 | 3 | 2 | 4 | 3 | 4 | 1 |
| Mirror Peripheral Portion (mm) | 0.7 | 0.8 | 0.6 | 0.8 | 0.9 | 0.8 | 0.6 |
| CASS Test |  |  |  |  |  |  |  |
| Back Coating Film | A | A | A | A | A | A | A |
| Mirror Inner Portion | 3 | 4 | 2 | 5 | 4 | 3 | 2 |
| Mirror Peripheral Portion (mm) | 1.2 | 1.7 | 1.0 | 1.4 | 1.6 | 1.6 | 0.8 |
| Storage Stability Test |  |  |  |  |  |  |  |
| Abnormalities | A | A | A | A | A | A | A |
| Viscosity bef. Test | 61KU | 63KU | 61KU | 65KU | 59KU | 59KU | 61KU |
| Viscosity after Test | 75KU | 81KU | 85KU | 76KU | 74KU | 80KU | 83KU |
| Lead Concentration of Mirror by TCPL extraction method (mg/L) | 0 | 0 | 0 | 0 | 0 | 0 | 0 |

TABLE 4

|  | Ex. 8 | Ex. 9 | Ex. 10 | Ex. 11 | Com. Ex. 1 | Com. Ex. 2 | Com. Ex. 3 |
| --- | --- | --- | --- | --- | --- | --- | --- |
| Back Coating Film Thickness ($\mu$m) | 51 | 49 | 52 | 48 | 50 | 49 | 50 |
| Pencil Scratch Test | H | H | H | H | H | H | H |
| Cross-cut Adhesion Test | 100 | 100 | 100 | 100 | 90 | 100 | 100 |
| Acid Immersion Test |  |  |  |  |  |  |  |
| Back Coating Film | A | A | A | A | B | B | A |
| Mirror Inner Portion | A | A | A | A | $\infty$ | $\infty$ | A |
| Mirror Peripheral Portion (mm) | 0.6 | 0.8 | 0.4 | 0.4 | 10.0 | 5.0 | 0.5 |
| Alkali Immersion Test |  |  |  |  |  |  |  |
| Back Coating Film | A | A | A | A | B | A | A |
| Mirror Inner Portion | A | A | A | A | A | A | A |
| Mirror Peripheral Portion | A | A | A | A | A | A | A |

TABLE 4-continued

| | Ex. 8 | Ex. 9 | Ex. 10 | Ex. 11 | Com. Ex. 1 | Com. Ex. 2 | Com. Ex. 3 |
|---|---|---|---|---|---|---|---|
| Water Resistance Test | | | | | | | |
| Back Coating Film | A | A | A | A | B | A | A |
| Mirror Inner Portion | A | A | A | A | ∞ | ∞ | A |
| Mirror Peripheral Portion (mm) | 0.8 | 1.1 | 0.6 | 0.7 | 15.0 | 10.0 | 0.8 |
| Salt Spray Test | | | | | | | |
| Back Coating Film | A | A | A | A | B | A | A |
| Mirror Inner Portion | 3 | 4 | A | A | ∞ | ∞ | 1 |
| Mirror Peripheral Portion (mm) | 0.8 | 0.9 | 0.5 | 0.5 | X | 15.0 | 0.5 |
| CASS Test | | | | | | | |
| Back Coating Film | A | A | A | A | C | B | A |
| Mirror Inner Portion | 3 | 4 | 1 | 2 | X | X | 1 |
| Mirror Peripheral Portion (mm) | 1.5 | 1.5 | 0.7 | 0.8 | X | 40.0 | 0.8 |
| Storage Stability Test | | | | | | | |
| Abnormalities | A | A | A | A | A | A | A |
| Viscosity bef. Test | 61KU | 60KU | 63KU | 60KU | 63KU | 61KU | 64KU |
| Viscosity after Test | 77KU | 79KU | 82KU | 85KU | 79KU | 78KU | 81KU |
| Lead Concentration of Mirror by TCPL extraction method (mg/L) | 0 | 0 | 0 | 0 | 0 | 0 | 40 |

The entire disclosure of Japanese Patent Application No. 8-75060 filed on Mar. 29, 1996 including specification, claims and summary is incorporated herein by reference in its entirety.

What is claimed is:

1. A coating composition for preparing a back coating film of a mirror, the mirror having a glass substrate, a silver mirror film that comprises silver and is formed on a back surface of the glass substrate, a metallic protective film that comprises a first metal and is formed on the silver mirror film, and the back coating film formed on the metallic protective film, the coating composition being substantially free of a lead component and comprising:

a vehicle containing a synthetic resin;

a first salt formed by a neutralization of an acid with a base containing a second metal having an ionization tendency that is greater than the silver and the first metal, said acid being one compound selected from the group consisting of organic acids each containing an azole ring and unsubstituted and substituted carbamic acids; and a basic compound selected from the group consisting of azoles and diamines.

2. A coating composition according to claim 1, wherein, said basic compound is such that, when a rust of at least one of the silver and the first metal is formed by corrosion, said rust is neutralized by said basic compound to form a second salt.

3. A coating composition according to claim 1, wherein said organic acids are thiazoles and benzimidazoles, said substituted carbamic acids are dithiocarbamic acids, said azoles are imidazole derivatives and thiazole derivatives, and said diamines are phenylenediamine derivatives.

4. A coating composition according to claim 1, wherein said first metal is copper.

5. A coating composition according to claim 1, wherein said second metal is at least one of zinc and iron.

6. A coating composition according to claim 1, wherein said first salt is in an amount of from 1 to 15 wt % of a total amount of a solid matter contained in the coating composition.

7. A coating composition according to claim 1, wherein said basic compound is in an amount of from 0.5 to 5 wt % of a total of a solid matter contained in the coating composition.

8. A coating composition according to claim 1, wherein the coating composition further comprises at least one pigment, and wherein a weight ratio of a total of said at least one pigment, said first salt and said basic compound to said synthetic resin is in a range of from 1:1 to 3:1.

9. A coating composition according to claim 1, wherein said first salt is at least one compound selected from the group consisting of zinc 2-mercaptobenzothiazole, zinc 2-mercaptobenzoimidazole, and zinc dimethyldithiocarbamate.

10. A coating composition according to claim 1, wherein said basic compound is at least one compound selected from the group consisting of 2,4-diamino-6-[2'-methylimidazolyl-(1')]ethyl-S-triazine, 1-cyanoethyl-2-phenylimidazole, and an adduct of 2,4-diamino-6-[2'-methylimidazolyl-(1')]ethyl-S-triazine and isocyanuric acid.

11. An anticorrosive mirror comprising:

a glass substrate;

a silver mirror film that comprises silver and is formed on a back surface of the glass substrate;

a metallic protective film that comprises a first metal and is formed on the silver mirror film; and a back coating film formed on the metallic protective film, the back coating film being prepared by curing a coating composition that is substantially free of a lead component and comprises:

a vehicle containing a synthetic resin;

a salt formed by a neutralization of an acid with a base containing a second metal having an ionization tendency that is greater than the silver and the first metal, said acid being one compound selected from the group consisting of organic acids each containing an azole ring and unsubstituted and substituted carbamic acids; and a basic compound selected from the group consisting of azoles and diamines.

* * * * *